(12) United States Patent
Haddadin

(10) Patent No.: US 10,493,625 B2
(45) Date of Patent: Dec. 3, 2019

(54) SYSTEM FOR GENERATING SETS OF CONTROL DATA FOR ROBOTS

(71) Applicant: CAVOS BAGATELLE VERWALTUNGS GMBH & CO. KG, München (DE)

(72) Inventor: Sami Haddadin, Hannover (DE)

(73) Assignee: Cavos Bagatelle Verwaltungs GmbH & Co. KG, Munich (DE)

( * ) Notice: Subject to any disclaimer, the term of this patent is extended or adjusted under 35 U.S.C. 154(b) by 0 days.

(21) Appl. No.: 15/508,328

(22) PCT Filed: Aug. 28, 2015

(86) PCT No.: PCT/DE2015/100356
§ 371 (c)(1),
(2) Date: Mar. 2, 2017

(87) PCT Pub. No.: WO2016/034167
PCT Pub. Date: Mar. 10, 2016

(65) Prior Publication Data
US 2017/0282367 A1    Oct. 5, 2017

(30) Foreign Application Priority Data

Sep. 2, 2014    (DE) .......................... 10 2014 112 639

(51) Int. Cl.
*B25J 9/16*    (2006.01)
*G05B 19/418*    (2006.01)

(52) U.S. Cl.
CPC ........... *B25J 9/1661* (2013.01); *B25J 9/1602* (2013.01); *B25J 9/163* (2013.01);
(Continued)

(58) Field of Classification Search
CPC ......... B25J 9/1661; B25J 9/1602; B25J 9/163
(Continued)

(56) References Cited

U.S. PATENT DOCUMENTS

| 6,330,493 B1 | 12/2001 | Takahashi et al. |
| 8,386,078 B1 | 2/2013 | Hickman et al. |

(Continued)

FOREIGN PATENT DOCUMENTS

| CN | 101763099 A | 6/2010 |
| DE | 29600609 U1 | 3/1997 |

(Continued)

OTHER PUBLICATIONS

English translation of International Preliminary Report on Patentability and Written Opinion issued in International Application No. PCT/DE2015/100356 dated Mar. 7, 2017.

(Continued)

*Primary Examiner* — Kawing Chan
*Assistant Examiner* — Bradley R Brown
(74) *Attorney, Agent, or Firm* — Hoffmann & Baron, LLP

(57) ABSTRACT

The invention relates to a system for generating sets of control data for networked robots, comprising a plurality of robots ($R_i$), wherein i=1, 2, 3, . . . , n, and n≥2, an optimizer (OE) and a database (DB), which are networked via a data network, wherein each robot ($R_i$) includes at least: a control unit ($SE_i$) for controlling and/or regulating the robot ($R_i$); a storage unit ($SPE_i$) for controlling sets of control data $SD_i(A_k)$, which in each case enable the control of the robot ($R_i$) in accordance with a predetermined task ($A_k$), wherein k=1, 2, 3, . . . , m; a unit ($EE_i$) for specifying a new task $A_{m+1}$ for the robot ($R_i$), wherein $A_{m+1} \neq A_k$; a unit ($EH_i$) for determining a set of control data $SD_i(A_{m+1})$ for execution of the task ($A_{m+1}$) by the robot ($R_i$), an evaluation unit ($BE_i$), which evaluates the set of control data $SD_i(A_{m+1})$ determined by the unit ($EH_i$), with regard to at least one parameter (P1) with the characteristic number $K_{P1}(SD_i(A_{m+1}))$, and a communication unit ($KE_i$) for communication with the optimizer (OE) and/or the database (DB) and/or other robots (Continued)

($R_{j\neq i}$), the optimizer (OE), which is designed and configured in order to determine, upon request by a robot ($R_i$), at least one optimized set of control data $SD_{i,P2}(A_{m+1})$ with regard to at least one predetermined parameter (P2), wherein the request by the robot ($R_i$) occurs when the characteristic number $K_{P1}(SD_i(A_{m+1}))$ does not meet a predetermined condition, and the data base (DB) stores the set of control data $SD_{i,P2}(A_{m+1})$ optimized by the optimizer (OE) and provides it to the robot ($R_i$) for execution of the task ($A_{m+1}$).

20 Claims, 1 Drawing Sheet

(52) U.S. Cl.
CPC ............... *G05B 19/41865* (2013.01); *G05B 2219/36289* (2013.01); *G05B 2219/36301* (2013.01); *G05B 2219/39361* (2013.01); *Y02P 90/18* (2015.11); *Y02P 90/20* (2015.11)

(58) Field of Classification Search
USPC .................................................... 318/568.11
See application file for complete search history.

(56) References Cited

U.S. PATENT DOCUMENTS

| | | | |
|---|---|---|---|
| 2005/0004707 A1 | 1/2005 | Kazi et al. | |
| 2006/0167917 A1* | 7/2006 | Solomon ............. | G05B 19/418 |
| 2007/0244599 A1* | 10/2007 | Tsai ....................... | B25J 9/1602 |
| | | | 700/245 |
| 2009/0112350 A1* | 4/2009 | Yuan ................ | G05B 19/41835 |
| | | | 700/117 |
| 2010/0161121 A1* | 6/2010 | Finsterwalder .. | G05B 19/41835 |
| | | | 700/245 |
| 2013/0144409 A1 | 6/2013 | Kushiro et al. | |

FOREIGN PATENT DOCUMENTS

| | | |
|---|---|---|
| DE | 60035651 T2 | 5/2008 |
| DE | 10314025 B4 | 4/2010 |
| DE | 102008062934 A1 | 6/2010 |
| EP | 1376284 A1 | 1/2004 |
| EP | 2466404 A1 | 6/2012 |
| JP | 11-104980 A | 4/1999 |
| JP | 2004-243461 A | 9/2004 |
| WO | WO2013/143585 A1 | 10/2013 |

OTHER PUBLICATIONS

International Search Report issued in International Application No. PCT/DE2015/100356 dated Mar. 3, 2016.

Yamamoto, M. et al., "Collision free minimum time trajectory planning for manipulators using global search and gradient method", Intelligent Robots and Systems '94, 'Advanced Robotic Systems and the Real World', IROS '94, Proceedings of the IEEE/RSJ/GI Intl. Conference on Munich, Germany Sep. 12-16, 1994, New York, NY USA, IEEE, vol. 3, Sep. 12, 1994, pp. 2184-2191.

Waibel, Markus, et al., "RoboEarth—A World Wide Web for Robots", IEEE Robotics and Automation Magazine, pp. 69-82, Jun. 2011.

Zweigle, Oliver, et al., "RoboEarth—connecting Robots worldwide", ICIS 2009, Proceedings of the 2nd International Conference on Interaction Sciences: Information Technology, Culture and Human Nov. 24-26, 2009, Seoul, Korea.

* cited by examiner

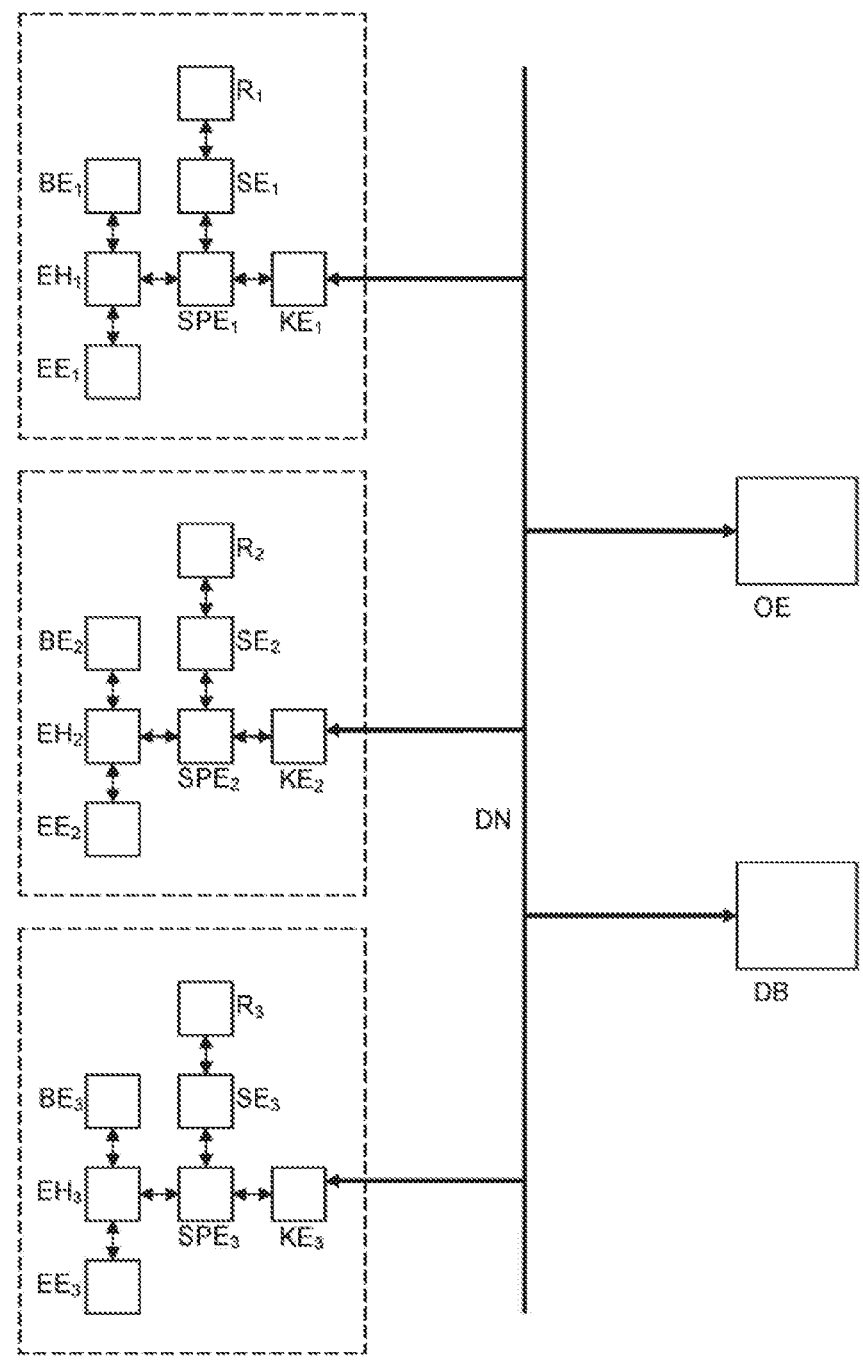

SYSTEM FOR GENERATING SETS OF CONTROL DATA FOR ROBOTS

CROSS-REFERENCE TO RELATED APPLICATIONS

This application is the U.S. National Phase of, and Applicant claims priority from, International Application No. PCT/DE2015/100356, filed 28 Aug. 2015, and German Patent Application No. DE 10 2014 112 639.4, filed 2 Sep. 2014, both of which are incorporated herein by reference in their entirety.

BACKGROUND

The invention relates to a system for generating or optimizing sets of control data, which define a control and/or regulation of a robot for execution of concrete tasks by this robot. The invention further relates to a method for operating such a system.

The term "set of control data" in the case at hand includes control and/or regulation data, or control and/or regulation commands, or control and/or regulation programs, and mixed forms thereof. By the implementation of the respective set of control data by the robot, a targeted influencing of physical or other parameters of the robot occurs, as a result of which the robot solves a task associated with the respective data set. For example, it performs a production step in an assembly line or a handling of an object. The terms "control" and "regulation" are used here in their conventional meaning.

Today, robots per se are becoming increasingly more complex and thus are also able to perform increasingly more complex tasks. Accordingly, the sets of control data for the control/regulation of robots, which are required for the performance of such complex tasks, have also become increasingly more complex. Moreover, the increasing networking of robots and the development of so-called "multiagent systems" today allow collective solutions for determining sets of control data.

SUMMARY

It is the object of the invention to indicate a system which makes it possible to determine optimized sets of control data for the control and/or regulation of networked robots.

The invention arises from the features of the independent claims. Advantageous developments and designs are the subject matter of the dependent claims. Further features, application possibilities, and advantages of the invention result from the following description as well as from the explanation of example embodiments of the invention, which are represented in the drawings.

The object is achieved with a system to generate sets of control data for networked robots. The proposed system includes a plurality of robots $R_i$, wherein $i=1, 2, 3, \ldots, n$, and $n \geq 2$, an optimizer OE and a database DB, which are networked with one another via a data network DN.

The networking of the robots $R_i$, the optimizer OE, and the database DB is preferably designed as an Internet-based data network (or communication network) DN. The networking can be implemented hardwired, or not hardwired (for example, by radio connection), or as a mixed form.

The term "robot" is used in the case at hand in the broad sense. In particular, it includes: robots with at least one unit which can be controlled or regulated, such as, for example, a manipulator, an effector, a drive element, an actuator, an element for locomotion, a sensor. The term "robot" further includes in particular robots which can be controlled or regulated and which have local or distributed intelligence, humanoids, self-learning robots, semiautonomous or autonomously acting robots, robots that are able to fly (drones), robots that are able to swim, robots that are able to dive, robots that are able to drive (autonomous road traffic), robots that can be used in medicine (for example, OP robots), and in particular combinations thereof.

The proposed system is characterized furthermore in that each robot $R_i$ includes at least: a control unit $SE_i$ to control and/or regulate the robot $R_i$; a storage unit $SPE_i$ to store sets of control data $SD_i(A_k)$, which allow in each case the control of the robot $R_i$ in accordance with a predetermined task $A_k$, wherein $k=0, 1, 2, \ldots, m$; a unit $EE_i$ to specify a new task $A_{m+1}$ for the robot $R_i$, wherein $A_{m+1} \neq A_k$; a unit $EH_i$ to determine a set of control data $SD_i(A_{m+1})$ for execution of the task $A_{m+1}$ by the robot $R_i$, an evaluation unit $BE_i$ to evaluate the set of control data $SD_i(A_{m+1})$ determined by the unit $EH_i$, with regard to at least one parameter P1 with the characteristic number $K_{P1}(SD_i(A_{m+1}))$, and a communication unit $KE_i$ enabled to provide communication of the robot $R_i$ with the optimizer OE, and/or the database DB, and/or other robots $R_{j \neq i}$.

The control unit $SE_i$ is advantageously connected to units of the robot $R_i$ which can be controlled or regulated. It preferably includes a processor to execute the sets of control data $SD_i$, or to execute executable programs generated based on the sets of control data $SD_i$.

A set of control data $SD_i$ enables or defines a concrete control/regulation of the respective robot $R_i$ so that, in the execution of the commands of the set of control data $SD_i(A_k)$, the task $A_k$ is executed. The term "set of control data" is understood in the broad sense in the case at hand and includes, for example, control commands, logical syntax, parameters, formulas, dates, etcetera.

The sets of control data $SD_i(A_k)$ are preferably stored locally for each robot, i.e., at the site of the robot, on the storage unit $SPE_i$. The storage unit $SPE_i$ can be a commercial mass storage, for example.

The term "task $A_k$" is understood in the broad sense in the case at hand. For example, the task $A_k$ can include changing the mechanical, electrical, and/or other state of the robot $R_i$ in a predetermined manner, and/or in changing the state of the environment in a predetermined manner, by the action of the robot $R_i$ on the environment thereof.

EXAMPLE

For example, in a simple case, a task can include picking up an object with a gripper arm of the robot in a position P1, bringing the object to a position P2, and depositing the object there. For this simple task alone, a plurality of possible sets of control data exists, which in principle execute this task. The plurality of possible sets of control data results, for example, from the fact that, between points P1 and P2, very different paths/trajectories can be covered variously fast or slowly, etc.

In the case at hand, it is assumed that a set of control data $SD_i(A_k)$ typically indicates one variant of several possible variants for solving the task $A_k$. That is, a task $A_k$ for the robot $R_i$ can also be solved with the sets of control data $SD_i(A_k)'$, $SD_i(A_k)''$, $SD_i(A_k)'''$, ..., wherein the number of apostrophes in each case identify different variants of the set of control data. Thus, to remain with the previous example, $SD_i(A_k)'$ and $SD_i(A_k)''$ can differ, for example, in the speed at which the gripper arm is moved between the positions P1 and P2.

In the case at hand, for a number of m tasks $A_k$, a number of m sets of control data $SD_i(A_k)$ are accordingly known to the robot $R_i$, wherein each set of control data $SD_i(A_k)$ solves the task $A_k$. Thus, each robot $R_i$ has its own local pool of sets of control data $SD_i(A_k)$ for the solution of certain tasks $A_k$.

The unit $EE_i$ for (local) specification of a new, unknown, i.e., not yet solved task $A_{m+1}$ for the robot $R_i$ preferably has a haptic, acoustic, and/or optical input interface, by using which a user can enter or specify the new task $A_{m+1}$.

To remain again with the previous example, such a task $A_{m+1}$ can include, for example, depositing the object not at P2 but at P3, where P2≠P3. Alternatively or additionally, the unit $EE_i$ can include an electronic data interface, by using which the new task $A_{m+1}$ can be specified, for example, by a computer.

The unit $EH_i$ is advantageously connected to the unit $EE_i$ and it preferably includes a processor and a programming which, based on a new task $A_{m+1}$ predetermined correspondingly for the robot $R_i$, makes it possible to determine a set of control data $SD_i(A_{m+1})$ for execution of the task $A_{m+1}$. Preferably, the unit $EH_i$ is designed and configured to be self-learning. Advantageously, the determination of the set of control data $SD_i(A_{m+1})$ occurs in an automated manner. Furthermore, advantageously the determination of the set of control data $SD_i(A_{m+1})$ is carried out by the unit $EH_i$ based on the sets of control data $SD_i(A_k)$, wherein k=0 to m. This means that already determined and thus locally known sets of control data $SD_i(A_k)$ are used as starting basis for the generation of the set of control data $SD_i(A_{m+1})$, and, for example, the set of control data $SD_i(A_{m+1})$ is determined by a corresponding variation of one or more of the known sets of control data $SD_i(A_k)$ in adaptation to the new task $A_{m+1}$. The unit $EH_i$ thus enables the robot $R_i$ to determine, using the locally available computing power, sets of control data $SD_i(A_{m+1})$ for the execution/performance of the new task $A_{m+1}$.

The evaluation unit $BE_i$ is advantageously connected to the unit $EH_i$ and preferably includes a processor and a programming which makes it possible to evaluate the set of control data $SD_i(A_{m+1})$ determined by the unit $EH_i$ with regard to at least one parameter P1 with the characteristic number $K_{P1}(SD_i(A_{m+1}))$ Such a parameter P1 can be, for example, the energy consumption or the time that the robot $R_i$ needs in order to completely or partially implement the course defined by the set of control data $SD_i(A_{m+1})$. The characteristic number $K_{P1}(SD_i(A_{m+1}))$ can preferably be understood to be a quality measure which indicates the quality of the set of control data $SD_i(A_{m+1})$ with regard to the parameter P1. Naturally, numerous other parameters P1 are conceivable, which, depending on the use or requirements can be selected alternatively or additionally. In particular, the parameter P1 can also be a combination of different sub-parameters, i.e., a parameter vector. Advantageously, the characteristic numbers $K_{P1}(SD_i(A_k))$ are stored in the local memory unit $SE_i$ and are thus available for further use.

The communication unit $KE_i$ is used for communication with the optimizer OE, and/or the database DB, and/or other robots $R_{j\neq i}$, and, advantageously, the communication unit $KE_i$ is designed as a digital communication interface.

The proposed system is further characterized in that the optimizer OE is designed and configured to determine a set of control data $SD_{i,P2}(A_{m+1})$ optimized, upon request by a robot $R_i$, with regard to at least one predetermined parameter P2, wherein the request by the robot $R_i$ occurs when the characteristic number $K_{P1}(SD_i(A_{m+1}))$ does not meet a predetermined condition. In other words, if the set of control data $SD_i(A_{m+1})$ determined by the unit $EH_i$ does not have the required quality (characteristic number $K_{P1}(SD_i(A_{m+1}))$) does not meet a predetermined condition) with regard to the parameter P1, then a set of control data $SD_{i,P2}(A_{m+1})$ optimized with regard to the parameter P2 is determined by the optimizer.

The optimizer can be implemented as a unit with at least one processor and a corresponding programming in the data network. The computing power and the degree of parallelization of the optimizer are advantageously higher by a multiple factor than the computing power and the degree of parallelization of a unit $EH_i$. The optimizer OE can alternatively be designed as a collaborative agent system in the data network DN, which includes at least the units $EH_i$ as agents, wherein the determination of the optimized set of control data $SD_{i,P2}(A_{m+1})$ occurs in one or more or all of the units $EH_i$. The last variant uses distributed computing capacities for the solution of complex optimization tasks in the context of so-called "cloud computing".

Advantageously, the optimizer OE is designed to be self-learning, i.e., it uses available knowledge in order to solve new optimization tasks, for example, sets of control data $SED_{i,P2}(A_k)$ already determined by it, and optionally associated determined characteristic numbers $K_{P2}(SD_i(A_k))$. Advantageously, the sets of control data $SD_i(A_k)$ of the local robot $R_i$ are also known to the optimizer OE and used for the determination of the sets of control data $SD_{i,P2}(A_k)$. Thus, the determination of the optimized set of control data $SD_{i,P2}(A_{m+1})$ occurs advantageously based on optimized sets of control data $SD_{i,P2}(A_k)$, wherein k≤m, already determined by the optimizer OE, and/or known sets of control data $SD_i(A_k)$, wherein k≤m.

In an advantageous development of the proposed system, the parameters P1 and P2 are identical. In this case, a set of control data is optimized with regard to a uniform parameter, for example, the energy consumption of the robot. Advantageously, the parameter P1 and/or the parameter P2 is/are a partial energy consumption or a total energy consumption of the robot in the execution of the respective set of control data $SD_i$, or a partial or total time period needed by the robot for execution of the respective control data $SD_i$, or a combination thereof. Depending on the use and requirement, other values and/or other parameter combinations are naturally also conceivable.

EXAMPLE

Let P1=P2 the total energy consumption of the robot during the execution of a complete set of control data $SD_i(A_{m+1})$ Moreover, let the characteristic number $K_m(SD_i(A_{m+1}))$ be a characteristic number indicating the total energy consumption of the robot during the execution of the complete set of control data $SD_i(A_{m+1})$. Let the characteristic number $K_m(SD_i(A_{m+1}))$ be greater than a predetermined limit value (i.e., the implementation of the set of control data $SD_i(A_{m+1})$ is less energy-efficient), so that, by the respective robot $R_i$, a request is made to the optimizer OE, requesting it to determine a set of control data $SD_{i,P2}(A_{m+i})$ optimized with regard to the total energy consumption P2. This can be implemented in various ways. Thus, the optimizer OE can determine the optimized control data $SD_{i,P2}(A_{m+1})$ based on the set of control data $SD_i(A_{m+1})$ determined before by the unit $EH_i$. Alternatively, the optimizer OE can newly determine the optimized set of control data $SD_{i,P2}(A_{m+1})$ based on the predetermined task $A_{m+1}$, and the specification to determine the set of control data $SD_{i,P2}(A_{m+1})$ to be determined under the condition of an optimization of the parameter P2. In the last alternative, the set of control data $SD_i(A_{m+1})$ and the characteristic number $K_{P1}(SD_i(A_{m+1}))$ are advantageously used in the determination. Advantageously, the determination of the optimized set of control data $SD_{i,P2}(A_{m+1})$ is therefore carried out by the optimizer OE and with the use of the sets of control data $SD_i(A_k)$, wherein k=0, 1, m stored on the storage units $SPE_i$, and/or the characteristic number $K_m(SD_i(A_{m+1}))$ stored on the storage units $SPE_i$.

Advantageously, the unit $EH_i$ is moreover designed and configured so that the determination of the set of control data $SD_i(A_{m+1})$ occurs based on characteristic numbers $K_m(SD_i(A_k))$ which were determined for the sets of control data $SD_i(A_k)$, wherein k=0, 1, . . . , m. In particular, this advantageously makes it possible, for the determination of the set of control data $SD_i(A_{m+1})$, to use those sets of control data $SD_i(A_k)$ which already have certain characteristic numbers and thus have, for example, a particularly low energy consumption for the implementation of the process or a particularly low time requirement for the complete execution/implementation of the process by the robot $R_i$.

Finally, the proposed system is characterized in that the database DB stores the set of control data $SD_{i,P2}(A_{m+1})$ optimized by the optimization unit OE, and provides it to the robot $R_i$ for execution of the task $A_{m+1}$.

Advantageously, the optimizer OE also includes an evaluation unit $BE_{OPT}$, which evaluates the set of control data $SD_{i,P2}(A_{m+1})$ optimized by the optimizer OE, with regard to at least one parameter P2 with the characteristic number $K_{P2}(SD_i(A_{m+1}))$.

Thus, the proposed system allows an optimization of a set of control data $SD_i(A_{m+1})$, which was generated locally, i.e., at the site of the robot $R_i$, with regard to a parameter P2 by an optimizer OE configured and designed especially for this task. The optimizer OE advantageously has access to all the sets of control data $SD_i(A_k)$, $SD_{i,P2}(A_k)$ already known in the (possibly worldwide) data network, and to associated characteristic numbers $K_{P1}(SD_i(A_k))$, $K_{P2}(SD_i(A_k))$. In a preferred variant, the optimizer is designed so that the determination of the optimized set of control data $SD_{i,P2}(A_{m+1})$ occurs in the context of so-called "cloud computing". Thus the knowledge of other robots $R_i$, possibly distributed worldwide, can be used for control and regulation data sets.

Advantageously, the database DB includes the storage units $SPE_i$. The database DB can include one or more digital storage units $SPE_i$ distributed in the data network.

The invention further relates to a method for operating a system, including a plurality of robots $R_i$, wherein i=1, 2, 3, . . . , n, and n≥2, an optimizer OE, a database DB, which are networked with one another via a data network DN for data exchange, wherein a control unit $SE_i$ controls the robot $R_i$; a storage unit $SPE_i$ of the robot $R_i$ stores sets of control data $SD_i(A_k)$, which in each case enable the control of the robot $R_i$ in accordance with a predetermined task $A_k$, wherein k=0, 1, 2, . . . , m; via a unit $EE_i$ of the robot $R_i$, a new task $A_{m+1}$ can be specified for the robot $R_i$, wherein: $A_{m+1} \neq A_k$; a unit $EH_i$ of the robot $R_i$ determines a set of control data $SD_i(A_{m+1})$ for execution of the task $A_{m+1}$, an evaluation unit $BE_i$, which evaluates the set of control data $SD_i(A_{m+1})$ determined by the unit $EH_i$, with regard to at least one parameter P1 with the characteristic number $K_{P1}(SD_i(A_{m+1}))$, the optimizer OE, upon request by a robot $R_i$, determines at least one set of control data $SD_{i,P2}(A_{m+1})$ optimized with regard to a predetermined parameter P2, wherein the request by the robot $R_i$ occurs when the characteristic number $K_{P1}(SD_i(A_{m+1}))$ does not meet a predetermined condition, and the data base DB stores the set of control data $SD_{i,P2}(A_{m+1})$ optimized by the optimizer OE, and provides it to the robot $R_i$ for execution of the task $A_{m+1}$.

Advantages and advantageous developments of the method result from an analogous and corresponding application of the explanations provided above in connection with the proposed system.

Additional advantages, features and details result from the following description, in which—optionally in reference to the drawings—at least one example embodiment is described in detail. Identical, similar and/or functionally equivalent parts are provided with identical reference numerals.

BRIEF DESCRIPTION OF THE DRAWINGS

In the drawings:

FIG. 1 shows a schematic structure of a variant of the proposed system.

DETAILED DESCRIPTION

FIG. 1 shows a schematic structure of a variant of the proposed system for generating sets of control data for networked robots, including three robots $R_1$, $R_2$, $R_3$, an optimizer OE, and a database DB, which are networked via a data network DN. Each of the robots $R_i$, wherein i=1, 2, 3, includes: a control unit $SE_i$ to control and/or regulate the robot $R_i$, a storage unit $SPE_i$ to store sets of control data $SD_i(A_k)$, which each enable the control of the robot $R_i$ in accordance with the predetermined task $A_k$, wherein k=0, 1, 2, . . . , m; a unit $EE_i$ to specify a new task $A_{m+1}$ for the robot $R_i$, wherein $A_{m+1} \neq A_k$; a unit $EH_i$ to determine a set of control data $SD_i(A_{m+1})$ for execution of the task $A_{m+1}$ by the robot $R_i$, an evaluation unit $BE_i$ to evaluate the set of control data $SD_i(A_{m+1})$ determined by the unit $EH_i$ with regard to at least one parameter P1 with the characteristic number $K_{P1}(SD_i(A_{m+1}))$, and a communication unit $KE_i$ enabled to provide communication of the robot $R_i$ with the optimizer OE, and/or with the database DB, and/or other robots $R_{j \neq i}$ via data network DN. The data communication between the respective robots $R_i$ and the local units associated therewith ($SE_i$, $SPE_i$, $EH_i$, $EE_i$, $BE_i$ and $KE_i$) can be obtained in this example embodiment in accordance with the arrows shown.

The optimizer OE is designed and configured to determine, upon request by a robot $R_i$, a set of control data $SD_{i,P2}(A_{m+1})$ which has been optimized with regard to at least one predetermined parameter P2, wherein the requirement by the robot $R_i$ occurs if the characteristic number $K_{P1}(SD_i(A_{m+1}))$ does not meet a predetermined condition. The database DB stores the sets of control data $SD_{i,P2}(A_{m+1})$ optimized by the optimizer OE and provides them to the robot $R_i$ for execution of the task $A_{m+1}$.

Although the invention is illustrated further and explained in detail by preferred example embodiments, the invention is not limited to the disclosed examples, and other variants can be derived therefrom by the person skilled in the art, without departing from the scope of protection of the invention. Therefore, it is clear that a plurality of possible variations exists. It is also clear that embodiments mentioned as examples in fact only represent examples which in no way can be conceived of as limiting, for example, the scope of protection, the application possibilities, or the configuration of the invention. Instead, the predetermined description and the FIGURE description allow the person skilled in the art in the position to concretely implement the example embodiments, wherein the person skilled in the art, having learned the disclosed inventive thought, can make multiple changes, for example, with regard to the function or the arrangement of individual elements mentioned in an example embodiment, without departing from the scope of protection which is defined by the claims and their legal equivalences, for example, further explanations in the description.

The invention claimed is:

1. A system to generate sets of control data for networked robots, the system comprising a plurality of robots $R_i$, wherein i=1, 2, 3, . . . , n, and n≥2, an optimizer OE, and a database DB, which are networked via a data network DN, wherein:
   each robot $R_i$ comprises at least:
      a control unit $SE_i$ to control the robot $R_i$;
      a storage unit $SPE_i$ to store sets of control data $SD_i(A_k)$, which in each case enable control of the robot $R_i$ in accordance with a predetermined task $A_k$, wherein k=0, 1, 2, . . . , m;
      a unit $EE_i$ to specify a new task $A_{m+1}$ not yet solved for the robot $R_i$, wherein $A_{m+1} \neq A_k$, and wherein the unit $EE_i$ comprises a haptic, acoustic, and/or optical input interface configured to enable a user to locally enter user input causing the unit $EE_i$ to specify the new task $A_{m+1}$;
      a unit $EH_i$ to determine a set of control data $SD_i(A_{m+1})$ for execution of the new task $A_{m+1}$ by the robot $R_i$; and
      an evaluation unit $BE_i$ to evaluate the set of control data $SD_i(A_{m+1})$ determined by the unit $EH_i$, with regard to at least one parameter P1 with a characteristic number $K_{P1}(SD_i(A_{m+1}))$;
   the optimizer OE to determine, upon request by the robot $R_i$, at least one optimized set of control data $SD_{i,P2}(A_{m+1})$ with regard to at least one predetermined parameter P2, wherein the request by the robot $R_i$ occurs when the characteristic number $K_{P1}(SD_i(A_{m+1}))$ does not meet a predetermined condition; and
   the database DB to store the optimized set of control data $SD_{i,P2}(A_{m+1})$ as optimized by the optimizer OE, and to provide the optimized set of control data $SD_{i,P2}(A_{m+1})$ to the robot $R_i$ for execution of the new task $A_{m+1}$.

2. The system according to claim 1, wherein the parameter P1 and the parameter P2 are identical.

3. The system according to claim 1, wherein the parameter P1 or the parameter P2 is a partial energy consumption or a total energy consumption of the robot $R_i$ in execution of a respective set of control data $SD_i$, or a total time period which the robot $R_i$ needs for execution of the respective control data $SD_i$ or a combination thereof.

4. The system according to claim 1, wherein the unit $EH_i$ is configured to be self-learning, wherein the set of control data $SD_i(A_{m+1})$ is determined based on the set of control data $SD_i(A_k)$ for k=0 to m.

5. The system according to claim 4, wherein the unit $EH_i$ is configured so that the set of control data $SD_i(A_{m+1})$ is determined based on characteristic numbers $K(SD_i(A_k))$.

6. The system according to claim 1, wherein the optimizer OE is configured to be self-learning, wherein the optimized set of control data $SD_{i,P2}(A_{m+1})$ is determined based on already determined optimized sets of control data $SD_{i,P2}$.

7. The system according to claim 1, wherein the optimizer OE is configured as a collaborative agent system in the data network DN, the collaborative agent system comprising at least the units $EH_i$ as agents, wherein the optimized set of control data $SD_{i,P2}(A_{m+1})$ is determined in one or more or all of the units $EH_i$.

8. The system according to claim 1, wherein the optimized set of control data $SD_{i,P2}(A_{m+1})$ is determined by the optimizer OE using sets of control data $SD_i(A_k)$, wherein k=0, 1, m, stored on the storage units $SPE_i$.

9. The system according to claim 1, wherein the characteristic numbers $K_{P1}(SD_i(A_k))$ are stored on the storage unit $SPE_i$.

10. A method of generating sets of control data for networked robots in a system comprising a plurality of robots $R_i$, wherein i=1, 2, 3, . . . , n, and n≥2, an optimizer OE, and a database DB, which are networked via a data network DN, wherein each robot $R_i$ comprises at least a control unit $SE_i$, a storage unit $SPE_i$, a unit $EE_i$, a unit $EH_i$, and an evaluation unit $BE_i$, the method comprising:
   controlling each robot $R_i$ via a control unit $SE_i$ of the robot $R_i$;
   storing in the storage unit $SPE_i$ of the robot $R_i$ sets of control data $SD_i(A_k)$, which in each case enable control of the robot $R_i$ in accordance with a predetermined task $A_k$, wherein k=0, 1, 2, . . . , m;
   specifying a new task $A_{m+1}$ for the robot $R_i$ via the unit $EE_i$ of the robot $R_i$, wherein $A_{m+1} \neq A_k$, and wherein the unit $EE_i$ comprises a haptic, acoustic, and/or optical input interface configured to enable a user to locally enter user input causing the unit $EE_i$ to specify the new task $A_{m+1}$;
   determining via the unit $EH_i$ of the robot $R_i$ a set of control data $SD_i(A_{m+1})$ for execution of the new task $A_{m+1}$;
   evaluating via the evaluation unit $BE_i$ of the robot $R_i$ the set of control data $SD_i(A_{m+1})$ determined by the unit $EH_i$, with regard to at least one parameter P1 with a characteristic number $K_{P1}(SD_i(A_{m+1}))$;
   determining via the optimizer OE, upon request by the robot $R_i$, at least one optimized set of control data $SD_{i,P2}(A_{m+1})$ with regard to a predetermined parameter P2, wherein the request by the robot $R_i$ occurs when the characteristic number $K_{P1}(SD_i(A_{m+1}))$ does not meet a predetermined condition; and
   storing in the database DB the optimized set of control data $SD_{i,P2}(A_{m+1})$ as optimized by the optimizer OE, and providing the optimized set of control data $SD_{i,P2}(A_{m+1})$ to the robot $R_i$ for execution of the task $A_{m+1}$.

11. The method according to claim 10, wherein the parameter P1 and the parameter P2 are identical.

12. The method according to claim 10, wherein the parameter P1 or the parameter P2 is a partial energy consumption or a total energy consumption of the robot $R_i$ in execution of a respective set of control data $SD_i$, or a total time period which the robot $R_i$ needs for execution of the respective control data $SD_i$, or a combination thereof.

13. The method according to claim 10, wherein the unit $EH_i$ is configured to be self-learning, wherein the set of control data $SD_i(A_{m+1})$ is determined based on the set of control data $SD_i(A_k)$ for k=0 to m.

14. The method according to claim 13, wherein the unit $EH_i$ is configured so that the set of control data $SD_i(A_{m+1})$ is determined based on characteristic numbers $K(SD_i(A_k))$.

15. The method according to claim 10, wherein the optimizer OE is configured to be self-learning, wherein the optimized set of control data $SD_{i,P2}(A_{m+1})$ is determined based on already determined optimized sets of control data $SD_{i,P2}$.

16. The method according to claim 10, wherein the optimizer OE is configured as a collaborative agent system in the data network DN, the collaborative agent system comprising at least the units $EH_i$ as agents, wherein the optimized set of control data $SD_{i,P2}(A_{m+1})$ is determined in one or more or all of the units $EH_i$.

17. The method according to claim 10, wherein the optimized set of control data $SD_{i,P2}(A_{m+1})$ is determined by the optimizer OE using sets of control data $SD_i(A_k)$, wherein k=0, 1, m, stored on the storage units $SPE_i$.

18. The method according to claim 10, wherein the method comprises storing the characteristic numbers $K_{P1}(SD_i(A_k))$ on the storage unit $SPE_i$.

19. The method according to claim 10, wherein the method comprises enabling provision of communication via a communication unit $KE_i$ of each robot $R_i$ with the optimizer OE, the database DB, and other robots $R_{j \neq i}$ over the data network DN.

20. The system according to claim 1, wherein each robot $R_i$ further comprises a communication unit $KE_i$ enabled to provide communication of the robot $R_i$ with the optimizer OE, the database DB, and other robots $R_{j \neq i}$ over the data network DN.

\* \* \* \* \*